United States Patent
Tang et al.

(10) Patent No.: US 10,909,247 B2
(45) Date of Patent: Feb. 2, 2021

(54) COMPUTING DEVICE HAVING TWO TRUSTED PLATFORM MODULES

(71) Applicant: Lenovo Enterprise Solutions (Singapore) Pte. Ltd., Singapore (SG)

(72) Inventors: Wenwei Tang, Shanghai (CN); Tianhe Li, Shanghai (CN); He Huang, Shanghai (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 134 days.

(21) Appl. No.: 16/121,954

(22) Filed: Sep. 5, 2018

(65) Prior Publication Data
US 2019/0228157 A1 Jul. 25, 2019

(30) Foreign Application Priority Data
Jan. 24, 2018 (CN) .......................... 2018 1 0068740

(51) Int. Cl.
*G06F 11/00* (2006.01)
*G06F 21/57* (2013.01)
(Continued)

(52) U.S. Cl.
CPC ........ *G06F 21/572* (2013.01); *G06F 11/2284* (2013.01); *G06F 12/0246* (2013.01);
(Continued)

(58) Field of Classification Search
CPC ...... G06F 21/572; G06F 21/00; G06F 21/554; G06F 21/57; G06F 21/71; G06F 21/50;
(Continued)

(56) References Cited

U.S. PATENT DOCUMENTS

| 9,122,893 | B1* | 9/2015 | Dasari | ..................... G06F 21/71 |
| 2007/0174600 | A1* | 7/2007 | Williams | .............. G06F 21/629 713/1 |

(Continued)

OTHER PUBLICATIONS

Turley, J. "White Paper Introduction to Intel® Architecture." (2014). (Year: 2014).*

*Primary Examiner* — Anthony J Amoroso
(74) *Attorney, Agent, or Firm* — Jeffrey Streets

(57) ABSTRACT

A computing device is provided including a motherboard including a control module, a first trusted platform module (TPM), and a second TPM. The control module directs security operations to the first TPM, wherein the control module is operable to detect whether or not the first TPM is damaged, and wherein the control module, in response to detecting that the first TPM is damaged, is operable to direct subsequent security operations to be performed by the second TPM. A computer program product is also provided including non-transitory computer readable storage media embodying program instructions executable by a processor to direct security operations to a first TPM coupled to a motherboard of the computing device, detect whether or not the first TPM is damaged, and, responsive to detecting that the first TPM is damaged, direct subsequent security operations to a second TPM coupled to the motherboard of the computing device.

20 Claims, 4 Drawing Sheets

(51) Int. Cl.
  *G06F 11/22*   (2006.01)
  *H04L 9/32*    (2006.01)
  *G06F 12/02*   (2006.01)
  *G06F 21/00*   (2013.01)
  *G06F 21/71*   (2013.01)
  *H04L 9/08*    (2006.01)
  *G06F 21/55*   (2013.01)

(52) U.S. Cl.
  CPC ............ *G06F 21/00* (2013.01); *G06F 21/554* (2013.01); *G06F 21/57* (2013.01); *G06F 21/71* (2013.01); *H04L 9/0897* (2013.01); *H04L 9/3234* (2013.01); *G06F 2212/206* (2013.01); *G06F 2221/2153* (2013.01); *H04L 2209/127* (2013.01); *H04L 2209/26* (2013.01)

(58) Field of Classification Search
  CPC .... G06F 11/2284; G06F 11/16; G06F 11/202; G06F 11/2023; G06F 11/2025; G06F 11/2028; G06F 11/2033; G06F 11/2038; G06F 11/22; G06F 11/30; G06F 11/3003; G06F 11/3024; G06F 11/3031; G06F 12/0246; G06F 2011/2278; G06F 2212/206; G06F 2221/2153; H04L 9/0897; H04L 9/3234; H04L 9/0877; H04L 2209/127; H04L 2209/26
  See application file for complete search history.

(56) References Cited

U.S. PATENT DOCUMENTS

| | | | |
|---|---|---|---|
| 2007/0192597 A1* | 8/2007 | Bade | G06F 21/57 713/167 |
| 2016/0335071 A1* | 11/2016 | Ham | G06F 9/44 |
| 2018/0227391 A1* | 8/2018 | Zimmer | H04L 67/34 |

* cited by examiner

COMPUTING DEVICE HAVING TWO TRUSTED PLATFORM MODULES

CROSS-REFERENCE TO RELATED APPLICATIONS

This application claims priority under 35 U.S.C. § 119 to Chinese Patent Application No. 201810068740.7 filed Jan. 24, 2018, the entire text of which is specifically incorporated by reference herein.

BACKGROUND

The present disclosure relates to a secure cryptoprocessor used in a computing device, and in particular to detection and handling of a failure of such cryptoprocessor.

BACKGROUND OF THE RELATED ART

The security of information stored on computer systems is a primary concern. Many different techniques have been implemented to secure such information, including security application software installed on computer systems and hardware keys required for access to information. Another way to secure information is known as the Trusted Platform Module (TPM) specification from the Trusted Computing Group (TCG). In this specification, a standard chipset including a programmable microcontroller is provided on a computer's circuit board during manufacturing, and is used to store and secure information of the computer system that is desired to be protected, i.e., enable effective trusted computing features. The security architecture (i.e., the functions and the application program interface (API)) that runs on the microcontroller, can be referred to as a trusted platform module. A trusted platform module can offer a variety of features, including a random number generator, facilities for secure generation of cryptographic keys, and abilities to limit the use of keys, e.g., to signing and verification, and/or encryption and decryption.

However, a problem associated with trusted platform module chip in conventional computing devices is that the trusted platform module chip is soldered to the motherboard of the computing device, and the whole motherboard has to be replaced if the trusted platform module chip becomes corrupted. For example, the trusted platform module chip may become corrupted due to a firmware update or due to the internal storage of the trusted platform module chip wearing out. The replacement of the motherboard is very costly and also interrupts the normal operation of the computing device.

BRIEF SUMMARY

One embodiment provides a computing device, comprising a motherboard including a control module, a first trusted platform module, and a second trusted platform module. The control module directs security operations to the first trusted platform module, wherein the control module is operable to detect whether or not the first trusted platform module is damaged, and wherein the control module, in response to detecting that the first trusted platform module is damaged, is operable to direct subsequent security operations to be performed by the second trusted platform module.

Another embodiment provides a computer program product comprising non-transitory computer readable storage media having program instructions embodied therewith, the program instructions executable by a processor to: direct security operations to a first trusted platform module coupled to a motherboard of the computing device; detect whether or not the first trusted platform module is damaged; and responsive to detecting that the first trusted platform module is damaged, direct subsequent security operations to a second trusted platform module coupled to the motherboard of the computing device.

DETAILED DESCRIPTION

Figure 1:
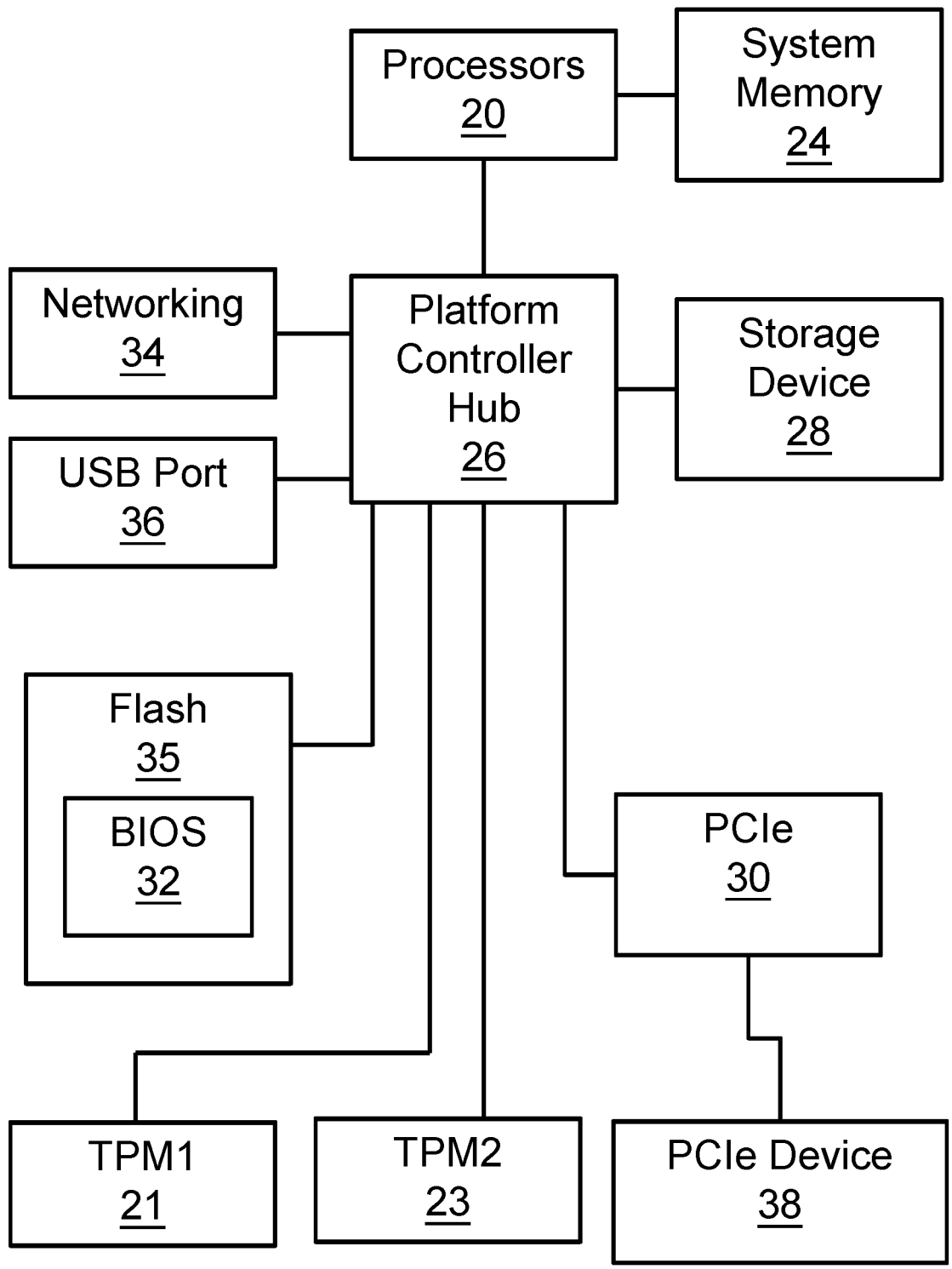
FIG. 1 is a block diagram of a computing device according to one embodiment.

One embodiment provides a computing device, comprising a motherboard including a control module, a first trusted platform module, and a second trusted platform module. The control module directs security operations to the first trusted platform module, wherein the control module is operable to detect whether or not the first trusted platform module is damaged, and wherein the control module, in response to detecting that the first trusted platform module is damaged, is operable to direct subsequent security operations to be performed by the second trusted platform module.

The control module may be adapted to detect that the first trusted platform module has been damaged, determine a level of damage of the first trusted platform module, and store a record in persistent storage on the motherboard, the record indicating a damaged status of the first trusted platform module.

In one specific implementation of the computing device, the control module includes a General-Purpose Input/Output circuit that may serve as a multiplexer or switch for directing communications to and from a selected one of the trusted platform modules. The control module, such as a Platform Controller Hub (PCH), controls the GPIO circuit to work like a switch so that signals or communications can be routed to either the first trusted platform module or the second trusted platform module in response to selection by the control module.

Furthermore, the computing device may further comprise a multiplexer coupled to the control module, the first trusted platform module and the second trusted platform module, wherein the control module controls the multiplexer to toggle from the first trusted platform module to the second trusted platform module without modifying a trusted platform module memory map in Memory Mapped I/O (MMIO). Since only one of the trusted platform modules is used at any given point in time, the trusted platform modules may be considered to be redundant.

In one option, the control module may be further adapted to reboot the computing device after causing subsequent security operations to be directed to the second trusted platform module. Furthermore, the control module may direct subsequent security operations to be performed by the second trusted platform module by controlling a GPIO or multiplexer circuit to switch an output from being directed to the first trusted platform module to being directed to the second trusted platform module. The control module may also perform or initiate trusted platform module provisioning, trusted platform module version alignment check, or trusted platform module version toggling.

In another option, the control module may be further adapted to attempt sending a Trusted Platform Module Interface Specification command to the first trusted platform module, and receiving a responses therefrom. The control module may be additionally adapted to determine the level of damage based on the response received from the first trusted platform module.

In addition, the control module may be compatible with the Advanced Configuration and Power Interface (ACPI) standard and is adapted to detect or discover the availability of the first trusted platform module. Furthermore, the control module may configure either or both of the trusted platform modules, as needed.

Still further, the control module may comprise a Unified Extensible Firmware Interface (UEFI), wherein the control module is adapted to detect the availability of the first trusted platform module and determine the level of damage thereof during a Power-On Self-Test (POST) process of the computing device. The UEFI code may be stored in non-volatile memory, such as flash, and enables the detection of the trusted platform module during POST.

In one implementation, the control module is a platform controller hub.

Another embodiment provides a computer program product comprising non-transitory computer readable storage media having program instructions embodied therewith, the program instructions executable by a processor to: direct security operations to a first trusted platform module coupled to a motherboard of the computing device; detect whether or not the first trusted platform module is damaged; and responsive to detecting that the first trusted platform module is damaged, direct subsequent security operations to a second trusted platform module coupled to the motherboard of the computing device.

In one option, the program instructions executable by a processor to direct subsequent security operations to a second trusted platform module may include program instructions executable by a processor to control a multiplexer to switch from the first trusted platform module to the second trusted platform module without affecting a trusted platform module memory map in Memory Mapped I/O (MMIO).

In another option, the multiplexer may be a General-Purpose Input/Output circuit of the computing device.

Further, the program instructions may be further executable by a processor to reboot the computing device after controlling the multiplexer to switch from the first trusted platform module to the second trusted platform module.

Still further, the program instructions may be further executable by a processor to upgrade firmware of the second trusted platform module to a firmware version matching a firmware version of the first trusted platform module.

In an embodiment of the computer program product, the program instructions executable by a processor to detect whether or not the first trusted platform module is damaged, may include program instructions executable by a processor to send a Trusted Platform Module Interface Specification (TIS) command to the first trusted platform module, and receive a response to the command from the first trusted platform module. The program instructions executable by a processor to detect whether or not the first trusted platform module is damaged, may further include program instructions executable by a processor to receive a response to the command from the first trusted platform module, and determine a level of damage to the first trusted platform module based on the response received from the first trusted platform module.

In another embodiment of the computer program product, the program instructions may be further executable by a processor to determine that the first trusted platform module is damaged and the computing device is currently executing a Power-On Self-Test process, execute Unified Extensible Firmware Interface (UEFI) Driver Execution Environment (DXE) codes to store a record in persistent storage on the motherboard, the record indicating a damaged status of the first trusted platform module, and reboot the computing device.

In yet another embodiment of the computer program product, the program instructions may be further executable by a processor to determine that the first trusted platform module is damaged and the computing device loaded an operating system into system memory, load an Advanced Configuration and Power Interface driver with a pre-installed operating system driver, trigger a system management interrupt to execute a Unified Extensible Firmware Interface system management mode code causing a record to be stored in persistent storage on the motherboard, the record indicating a damaged status of the first trusted platform module, and reboot the computing device.

FIG. 1 illustrates a computing device according to one embodiment. The computing device may comprise one or more processors 20. The processors 20 may comprise any type of processors capable of executing software and/or process data signals. The processors 20 may be coupled to system memory 24 via a memory path for instruction and data storage and/or for storage of information, such as graphics commands, data and textures. The processors 20 may also be coupled to one or more peripheral devices 38 via PCIe ports coupled to a PCIe interconnect 30. The system memory 24 may be a hard disk, a floppy disk, random access memory (RAM), read only memory (ROM), flash memory, or any other type of medium readable by the processors 20. RAM may further include Non-volatile random-access memory (NVRAM), dynamic random-access memory (DRAM), and/or static random-access memory (SRAM).

The processors 20 may refer to more than one processor in the computing device, or one or more processors which may include multiple threads, multiple cores, or the like. Embodiments are not limited to computer systems or data processing device systems, but may be used in any form factor of device that uses unified extensible firmware interface (UEFI) and/or Basic Input/Output System (BIOS), such as handheld devices and embedded devices. Some examples of handheld devices include cellular phones, tablet computers, Internet Protocol devices, digital cameras, personal digital assistants (PDAs), or handheld PCs such as a netbook or notebook. Embedded devices may include a microcontroller, a digital signal processor (DSP), system on a chip, network computers (NetPC), set-top boxes, network hubs, wide area network (WAN) switches, or any other system.

The processors 20 may be coupled to a system logic chip 26. For example, the system logic chip 26 shown in the illustrated embodiment is a platform controller hub (PCH). In one embodiment, the PCH 26 may provide connections to one or more I/O devices, such as through a local I/O interconnect. In an embodiment, the local I/O interconnect may be a high-speed I/O bus, such as peripheral component interconnect (PCI) Express bus. The PCH 26 may direct data signals or other information between the processor 20 and one or more other components in the computing device and may bridge the data signals or information between the processor 20 and the system I/O.

Some examples of the one or more components include a data storage device 28, one or more PCIe port (not shown), a networking device 34, and a USB port 36. In one embodiment, data storage device 28 may include a hard disk drive, a floppy disk drive, a CD-ROM device, a flash memory device, or other mass storage device. Although FIG. 1 shows some examples of the components, the PCH 26 may provide connections to other components, such as audio I/O, keyboard/mouse I/O, and other integrated I/O components such as integrated driver electronics (IDE), local area network (LAN) and other serial expansion port, wireless transceiver, legacy I/O controller or the like.

Referring to FIG. 1, non-volatile memory, such as flash memory 35, may be coupled to PCH 26 via, e.g., a low pin count (LPC) bus. BIOS firmware 32 may reside in flash memory 35 and boot up may execute instructions from the flash memory, or firmware. Although FIG. 1 illustrates BIOS firmware 32 in flash memory 35, in some embodiments, BIOS firmware 32 may be stored in other non-volatile memory such as a firmware hub, or the like. In an embodiment, BIOS firmware 32 may be implemented by Unified Extensible Firmware Interface (UEFI) firmware or any other firmware interface between the operating system and the hardware of the computing device. The UEFI may sometimes be referred to as UEFI BIOS. Accordingly, the BIOS 32 may be either legacy BIOS or UEFI BIOS.

The computing device in FIG. 1 further contains two trusted platform modules (TPMs) to provide hardware-based authentication and tamper detection, namely TPM1 21 and TPM2 23. Each trusted platform module is a cryptoprocessor, which is a dedicated microcontroller designed to secure hardware through integrated generation of cryptographic keys. Both TPM1 21 and TPM2 23 are permanently attached or coupled to the motherboard (not shown), such as by soldering. TPM1 21 and TPM2 23 are both connected electrically to the PCH 26. Note that during normal operation, only one of the TPM1 21 and TPM2 23 will be activated and used by the computing device as the primary TPM, while the other TPM may be reserved as a backup.

Although FIG. 1 illustrates a computing device, embodiments may be used in any other hardware and software architecture, such as a platform using a plurality of processor cores or a platform using a processor or a coprocessor, a platform using I/O hubs, or memory control embedded within the processors, or the like.

Figure 2:
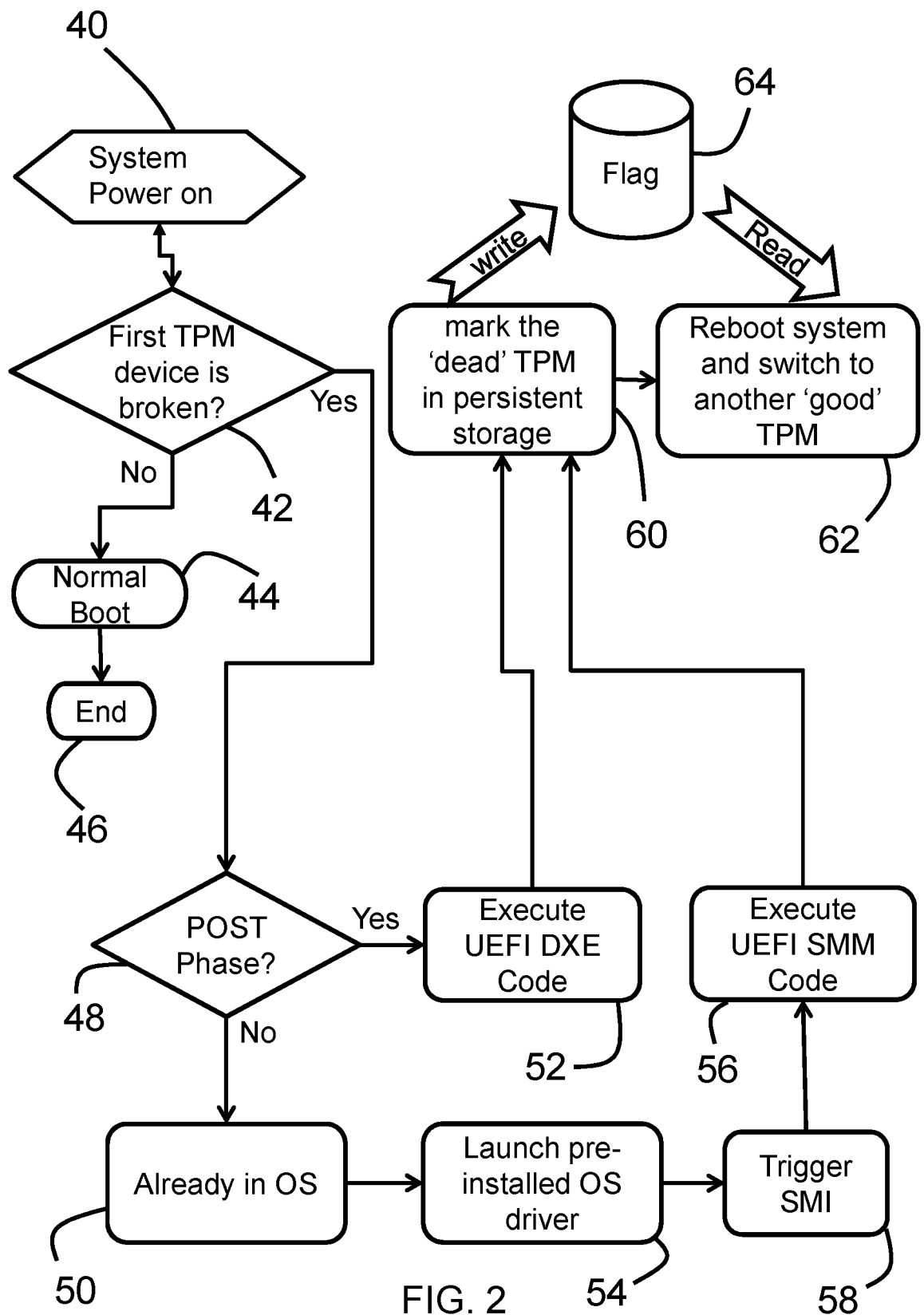
FIG. 2 is a flowchart of a method of detecting failure of a first trusted platform module, and performing failover to a second trusted platform module.

FIG. 2 is a flowchart of a method according to one embodiment of detecting the failure of a first trusted platform module (such as the TPM1 21 in FIG. 1) installed on the motherboard of a computing device, and either recovering the first trusted platform module, or abandoning the first trusted platform module and switching to a second trusted platform module for use as the primary trusted platform module. Each trusted platform module may include a TPM chip following the Trusted Platform Module specification. The method of FIG. 2 starts at step 40, in which the computing device is powered on and carries out a series of power-on self-test (POST) steps including initializing peripheral devices such as those shown in FIG. 1. The POST steps include checking and initializing the first trusted platform module installed on the motherboard of the computing device, such as TPM1 21 shown in FIG. 1. However, there is no particular requirement as to the order in which the peripheral devices of the computing device will be checked and initialized, or whether the first trusted platform module will be checked and initialized before or after other peripheral devices. Rather, the method allows the first trusted platform module to be checked and initialized at any stage during the POST phase, or even after the operating system is already loaded with a specific OS driver, as will be explained in more detail later.

Figure 3:
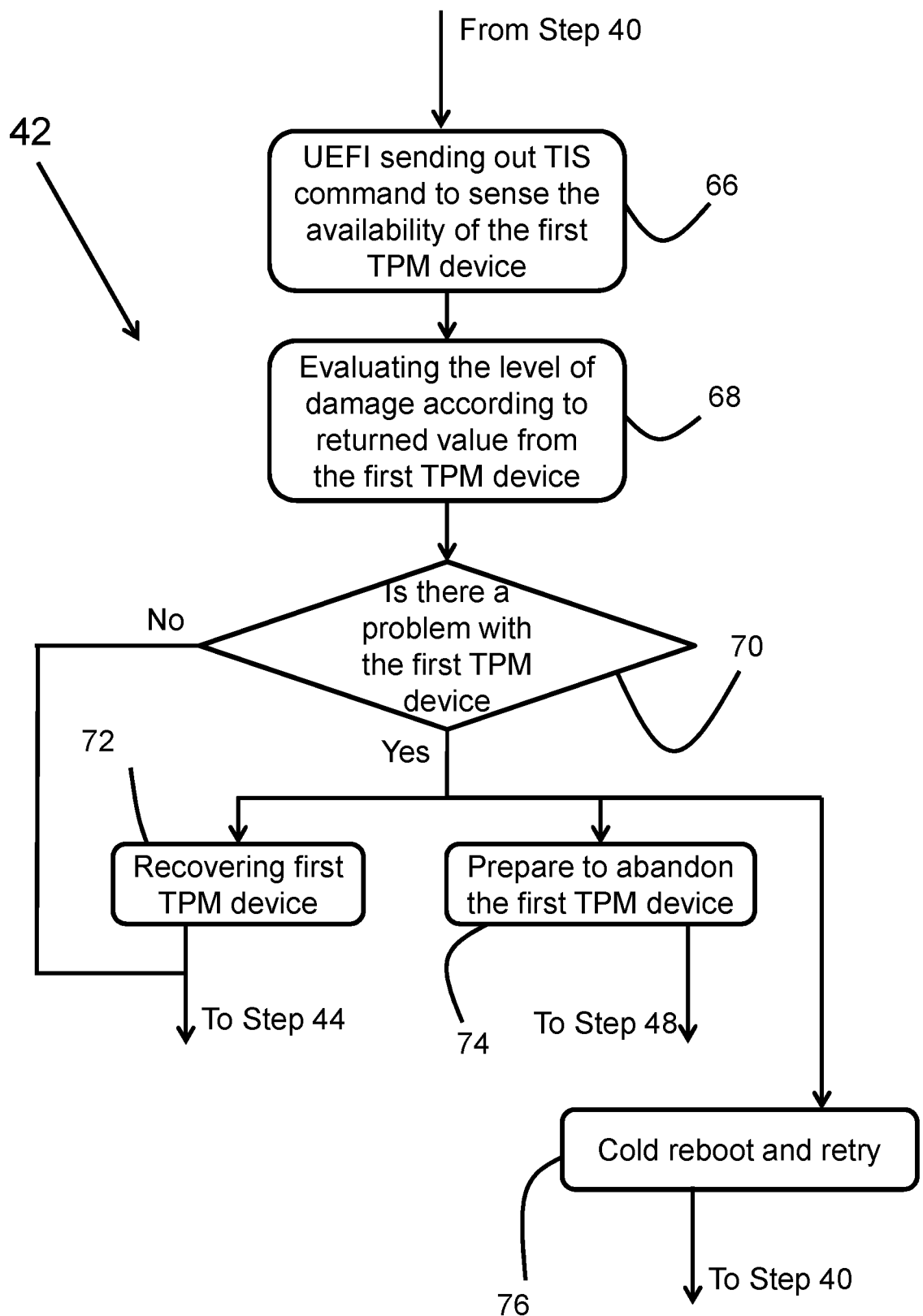
FIG. 3 is a flow chart showing the detailed steps of determining whether the first trusted platform module is damaged or broken as illustrated in step 42 of FIG. 2.

After the computing device is powered on in step 40, step 42 may include a control module of the computing device detecting the first trusted platform module and checking whether the first trusted platform module have some level of damage or malfunction (i.e., whether the operative condition of the trusted platform module is corrupted, inaccessible, broken, dead, etc.). FIG. 3 shows more details of step 42 according to an embodiment. In step 66, the UEFI sends out a TPM Interface Specification (TIS) command to sense the operative condition of the first trusted platform module. TIS is a well-known standardized TPM interface used to access a trusted platform module, and the UEFI may use a TIS command to query a particular memory range in the system memory of the computing device, where the first trusted platform module is mapped to the particular memory range that is queried. Next, in step 68, the UEFI attempts to receive a value returned from the first trusted platform module in response to the TIS command. Of course, it is possible that the UEFI will not receive a response from the first trusted platform module at all if the first trusted platform module is corrupted or temporarily malfunctioning. The UEFI may evaluate the operative condition of the first trusted platform module, based on either failure to receive a response from the first trusted platform module or, if a response is received from the first trusted platform module, the value returned in the response received from the trusted platform module. In certain embodiments, there can be multiple levels or types of damage defined for the trusted platform module, for example even more than four levels of damage, such that the trusted platform module may return a value reflecting any of the multiple levels or types of damage. In step 70, the UEFI decides whether there is any problem with the first trusted platform module that prevents the first trusted platform module from functioning normally. If there is no problem detected, then the method proceeds to step 44 in FIG. 2 where the computing device will continue to boot normally. However, if step 70 determines that there is a problem with the first trusted platform module, then the method will proceed from step 70 to one of the three handling steps shown by steps 72, 74 and 76, depending on the level of damage indicated for the first trusted platform module.

If the UEFI determines, in step 70, that the first trusted platform module has a first condition (i.e., a minor problem such as temporarily malfunctioning), then the method proceeds to step 72, where the UEFI may simply recover the first trusted platform module. After the first trusted platform module is recovered, then the method proceeds to step 44 in FIG. 2 where the computing device will continue to boot normally.

If the UEFI determines, in step 70, that the first trusted platform module has a second condition (i.e., a moderate problem), then the method proceeds to step 76, where the UEFI may cold reboot the computing device, such that the computing device will perform the POST procedure all over again in an attempt to return the first trusted platform module back to its normal state. After step 76, the method proceeds to step 40 in FIG. 2.

If, however, the UEFI determines, in step 70, that the first trusted platform module has a third condition (i.e., a major problem that will not allow the first trusted platform module to return to a normal state either by simple recovery or by cold reboot), then the method proceeds to step 74, where the UEFI prepares to abandon use of the first trusted platform module and switch to use of the second trusted platform module. After step 74, the method proceeds to step 48 and subsequent steps in which the first trusted platform module is no longer used and all trusted platform module functions are switched or directed to the second trusted platform module.

Referring back to FIG. 2, in step 48 the UEFI determines the current stage of the booting process of the computing device. For example, if the UEFI determines, in step 48, that the system is still in the POST phase, without the OS having been loaded yet, then the method proceeds to step 52 to execute UEFI Driver Execution Environment (DXE) codes directly. Execution of the DXE codes is possible in this situation since the operating system (OS) has not taken control of the computing device yet. However, if the system is no longer in the POST phase, then step 50 determines that the OS had already been loaded in, and the method will proceed to step 54. In the case the OS has been loaded into the system memory, Advanced Configuration and Power Interface (ACPI) will need to be involved since the UEFI codes cannot be directly executed in the presence of the OS. In step 54, the ACPI driver is loaded with a specific pre-installed OS driver. In a specific implementation, the method proceeds to step 58 to trigger a system management interrupt (SMI) in order to execute the UEFI System Management Mode (SMM) codes in step 56. It should be noted that the UEFI DXE codes executed in step 52 and the UEFI SMM codes executed in step 56 perform similar functions as shown in steps 60 and 62. However, the difference in the operating environment of the system after the OS has taken control of the computing system is dealt with by executing the SMM codes with the ACPI and SMI leveraged.

Regardless of whether the UEFI DXE codes are executed in step 52 or the UEFI SMM codes are executed in step 56, the UEFI proceeds to mark or designate the first trusted platform module, which was determined to be corrupted and unusable, to be "dead" in persistent storage in step 60. While designations other than "dead" may be used to indicate that the first trusted platform module should not be further used, step 60 makes sure that the damaged first trusted platform module will not be used by any other applications in the future. Furthermore, a flag 64 may be set in the persistent storage to indicate that TPM toggling or switching is needed. Then, the method proceeds to step 62, where the method reboots the computing system and switches to another "good" trusted platform module, such as the second trusted platform module. However, the details of step 62 are best illustrated in FIG. 4.

Figure 4:
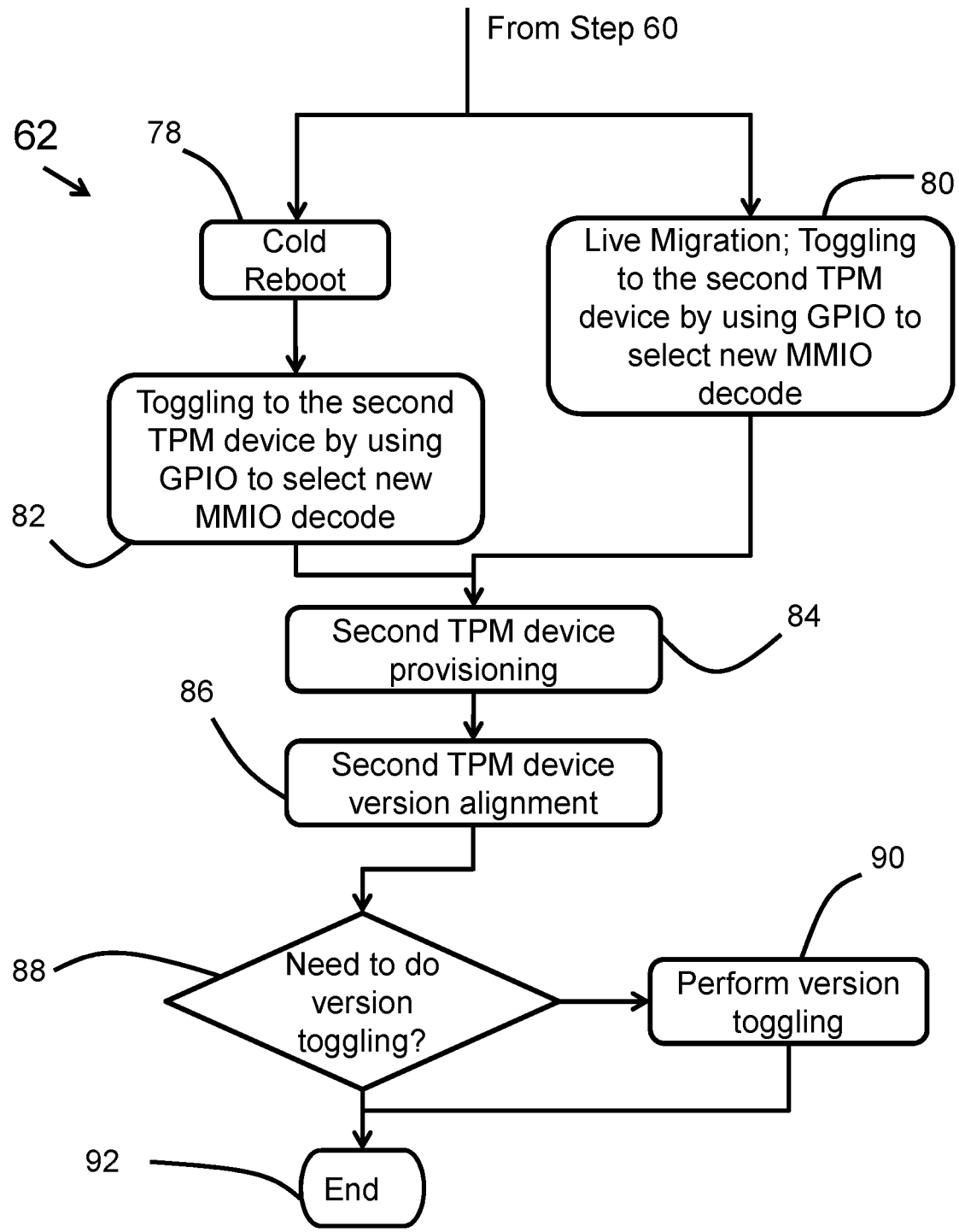
FIG. 4 is a flow chart showing the detailed steps of rebooting the computing system and switching to a second trusted platform module as illustrated in step 62 of FIG. 2.

In reference to FIG. 4, the UEFI may select a method for toggling the trusted platform modules, for example based upon whether the level of damage to the first trusted platform module is capable of supporting a live migration. A first way to toggle trusted platform modules is to initiate a cold reboot of the computing system in step 78. This is generally necessary if the first trusted platform module is incapable of supporting a live migration of data to the second trusted platform module. After the computing device has rebooted, the UEFI may then use a General-Purpose Input/Output (GPIO) circuit of the computing device to select the Memory Mapped I/O (MMIO) decode of the second trusted platform module in step 82. The GPIO circuit acts as a multiplexer here. The MMIO decode may be, for example, defined in the Intel Architecture (IA) x86 system, such that the MMIO decode is always the same to the operating system or any other application that makes use of the trusted platform module. Therefore, any toggling of the physical trusted platform modules is transparent to the operating system and software applications. It is the GPIO circuit which functions as an interface to access either of the first and second trusted platform modules without any modification to the existing operating system or any other applications make use of trusted platform modules.

Alternatively, if the UEFI determines that no cold reboot is required to toggle the trusted platform module, then instead of performing step 78, the computing system may perform step 80, in which a live migration is conducted to transfer data from the first trusted platform module to the second trusted platform module. Of course, the live migration is only possible if the first trusted platform module is still accessible by the computing system. The live migration requires interactions between the UEFI and the firmware of both trusted platform modules. In one option, a ROM hole mechanism, which is an area of flash memory for storing data other than the firmware, may be used to store data associated with the live migration in order to prevent data loss during the firmware operation.

After the system has switched from the first trusted platform module to the second trusted platform module, then the second trusted platform module will be provisioned (i.e. initialized) in step 84. Next, in step 86, the version of the second trusted platform module needs to be aligned with (i.e., made the same as) that of the first trusted platform module. There are currently two versions of the TPM specification, i.e. version 1.2 and version 2.0, and the first trusted platform module may have a different version with the second trusted platform module. Although both trusted platform modules are preinstalled to the motherboard and should presumably have the same TPM version, it is possible that the first trusted platform module may have been upgraded to a higher version during its normal use. By contrast, the second trusted platform module may still have the default (lower) TPM version since the second trusted platform module may have never been used until the occurrence of TPM device toggling. It may be important to ensure that the version of the second trusted platform module is identical to that of the first trusted platform module since, for example, TPM 2.0 is not backward compatible with TPM 1.2.

If it is determined in step 88 that the version of the second trusted platform module needs to be toggled, then this is performed in step 90. For example, the second trusted platform module may be upgraded prior to use. Regardless of whether the version toggling is performed or not, the whole TPM failure detection and failover process is completed in step 92.

The method described above solves the problem of having to replace the whole motherboard when a trusted platform module is corrupted and non-usable. Conventionally, the motherboard has only one trusted platform module. The method described above solves this problem by providing first and second trusted platform modules on the motherboard, and using a GPIO circuit of the platform controller hub or other multiplexer circuit to switch from the first trusted platform module to the second trusted platform module. Therefore, a redundancy is provided to the trusted platform module in the computing device where the second trusted platform module can be put into use if the first trusted platform module is corrupted. In addition, the method described above intelligently detects the level of damage to the first trusted platform module, and selects an appropriate strategy to alleviate the problem for example by reboot and retry, or toggling between the trusted platform modules.

The exemplary embodiments are thus fully described. Although the description refers to particular embodiments, it will be clear to one skilled in the art that the embodiments may be practiced with variation of these specific details. Hence the scope of the embodiments should not be construed as limited to the exemplary embodiments set forth herein.

While the foregoing embodiments have been illustrated and described in detail in the drawings and the foregoing description, the same is to be considered as illustrative and not restrictive in character, and should be understood as being examples that do not limit the scope of covered embodiments in any manner. It can be appreciated that any of the features described herein may be used with any embodiment. The illustrative embodiments are not exclusive of each other or of other embodiments not recited herein. Accordingly, various embodiments may comprise combinations of features from one or more of the illustrative embodiments described above. Modifications and variations of the embodiments as herein set forth can be made without departing from the spirit and scope thereof, and, therefore, only such limitations should be imposed as are indicated by the appended claims.

For example, in the embodiments described above, a first trusted platform module is described to be the default trusted platform module used by the computing device during normal operation, and a second trusted platform module is described as a backup trusted platform module which replaces the function of the first trusted platform module when the first trusted platform module is corrupted and unrecoverable. However, it should be noted that the designation of first and second trusted platform modules in this embodiment is only for the sake of easy description, and "first" and "second" do not refer to any particular trusted platform module among multiple trusted platform modules installed on the motherboard. For instance, the designations of "first" and "second" may be exchanged. Furthermore, a multiplexer for the selection of a trusted platform module is described in certain embodiments as being implemented by a GPIO circuit of the computing device. However, the multiplexer function may also be provided by a separate field-programmable gate array (FPGA) chip.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computing device, comprising:
 a motherboard including a control module, a first trusted platform module, and a second trusted platform module;
 wherein the control module is operable to:
  direct security operations to the first trusted platform module;
  detect whether or not the first trusted platform module is damaged;
  responsive to detecting that the first trusted platform module is damaged, direct subsequent security operations to be performed by the second trusted platform module;
  determine that the first trusted platform module is damaged and the computing device loaded an operating system into system memory;
  load an Advanced Configuration and Power Interface driver with a pre-installed operating system driver; and
  trigger a system management interrupt to execute a Unified Extensible Firmware Interface system management mode code causing a record to be stored in persistent storage on the motherboard, the record indicating a damaged status of the first trusted platform module.

2. The computing device of claim 1, wherein the control module is adapted to:
 determine a level of damage of the first trusted platform module.

3. The computing device of claim 2, wherein the control module is further adapted to attempt sending Trusted Platform Module Interface Specification commands to the first trusted platform module, and receiving responses therefrom.

4. The computing device of claim 3, wherein the control module is further adapted to determine the level of damage based on the responses received from the first trusted platform module.

5. The computing device of claim 2, wherein the control module comprises Advanced Configuration and Power Interface and the control module is adapted to detect the availability of the first trusted platform module.

6. The computing device of claim 2, wherein the control module includes Unified Extensible Firmware Interface code; and wherein the control module is adapted to detect the availability of the first trusted platform module and determine the level of damage thereof during a Power-On Self-Test process of the computing device.

7. The computing device of claim 2, wherein the control module is a platform controller hub.

8. The computing device of claim 1, further comprises:
 a multiplexer coupled to the control module, the first trusted platform module and the second trusted platform module, wherein the control module controls the multiplexer to toggle from the first trusted platform module to the second trusted platform module without modifying a trusted platform module memory map in Memory Mapped I/O (MMIO).

9. The computing device of claim 8, wherein the multiplexer is a General-Purpose Input/Output circuit of the control module.

10. The computing device of claim 1, wherein the control module is further adapted to reboot the computing device after causing subsequent security operations to be directed to the second trusted platform module.

11. The computing device of claim 10, wherein the control module directs subsequent security operations to be performed by the second trusted platform module by controlling a multiplexer circuit to switch an output from being directed to the first trusted platform module to being directed to the second trusted platform module.

12. A computer program product comprising non-transitory computer readable storage media having program instructions embodied therewith, the program instructions executable by a processor to:
 direct security operations to a first trusted platform module coupled to a motherboard of a computing device;
 detect whether or not the first trusted platform module is damaged;
 responsive to detecting that the first trusted platform module is damaged, direct subsequent security operations to a second trusted platform module coupled to the motherboard of the computing device;
 determine that the first trusted platform module is damaged and the computing device loaded an operating system into system memory;
 load an Advanced Configuration and Power Interface driver with a pre-installed operating system driver; and
 trigger a system management interrupt to execute a Unified Extensible Firmware Interface system management mode code causing a record to be stored in persistent storage on the motherboard, the record indicating a damaged status of the first trusted platform module.

13. The computer program product of claim 12, wherein the program instructions executable by a processor to direct subsequent security operations to a second trusted platform module include program instructions executable by a processor to control a multiplexer to switch from the first trusted platform module to the second trusted platform module without affecting a trusted platform module memory map in Memory Mapped I/O (MMIO).

14. The computer program product of claim 13, wherein the multiplexer is a General-Purpose Input/Output circuit of a platform controller hub.

15. The computer program product of claim 13, wherein the program instructions are further executable by a processor to:
reboot the computing device after controlling the multiplexer to switch from the first trusted platform module to the second trusted platform module.

16. The computer program product of claim 12, wherein the program instructions are further executable by a processor to:
upgrade firmware of the second trusted platform module to a firmware version matching a firmware version of the first trusted platform module.

17. The computer program product of claim 12, wherein the program instructions executable by a processor to detect whether or not the first trusted platform module is damaged, includes program instructions executable by a processor to send a Trusted Platform Module Interface Specification command to the first trusted platform module, and receive a response to the command from the first trusted platform module.

18. The computer program product of claim 17, wherein the program instructions executable by a processor to detect whether or not the first trusted platform module is damaged, includes program instructions executable by a processor to receive a response to the command from the first trusted platform module, and determine a level of damage to the first trusted platform module based on the response received from the first trusted platform module.

19. The computer program product of claim 12, wherein the program instructions are further executable by a processor to:
determine that the first trusted platform module is damaged and the computing device is currently executing a Power-On Self-Test process;
execute Unified Extensible Firmware Interface (UEFI) Driver Execution Environment (DXE) codes to store a record in persistent storage on the motherboard, the record indicating a damaged status of the first trusted platform module; and
reboot the computing device.

20. The computer program product of claim 12, wherein the program instructions are further executable by a processor to:
reboot the computing device after triggering the system management interrupt.

* * * * *